United States Patent [19]

Fernholz et al.

[11] 3,883,585

[45] May 13, 1975

[54] PROCESS FOR PURIFYING AND STABILIZING AQUEOUS ALKALI METAL SALT SOLUTIONS OF SORBIC ACID

[75] Inventors: Hans Fernholz, Fischbach, Taunus; Hans-Joachim Schmidt, Falkenstein, Taunus; Friedrich Wunder, Florsheim am Main, all of Germany

[73] Assignee: Hoechst Aktiengesellschaft, Frankfurt am Main, Germany

[22] Filed: Jan. 17, 1974

[21] Appl. No.: 434,042

Related U.S. Application Data

[63] Continuation-in-part of Ser. No. 380,745, July 19, 1973, abandoned.

[30] Foreign Application Priority Data

Mar. 3, 1973 Germany............................ 2310758

[52] U.S. Cl............................................. 260/526 N
[51] Int. Cl............................................. C07c 57/10
[58] Field of Search ................................ 260/526 N

[56] References Cited

FOREIGN PATENTS OR APPLICATIONS 1,175,006  12/1969  United Kingdom................ 260/526

Primary Examiner—James A. Patten
Attorney, Agent, or Firm—Curtis, Morris & Safford

[57] ABSTRACT

Aqueous alkali metal sorbate solutions are purified and stabilized by a treatment with surface active carbon on the basis of mineral coal.

7 Claims, No Drawings

PROCESS FOR PURIFYING AND STABILIZING AQUEOUS ALKALI METAL SALT SOLUTIONS OF SORBIC ACID

This application is a continuation-in-part of Application Serial No. 380,745 filed July 19, 1973 now abandoned.

This invention relates to a process for purifying and stabilizing alkali metal salt solutions of sorbic acid.

From among the salts of sorbic acid which are used for the preservation of foodstuffs, the potassium salt plays an important part owing to its high solubility in water and its relatively good stability. To produce pure potassium sorbate, that is potassium sorbate complying with the demands on the purity of preservatives for foodstuffs, pure sorbic acid is used. Due to its complicated purification, pure sorbic acid is a relatively expensive starting material and hence, processes for the manufacture of pure potassium sorbate or its aqueous solutions using crude sorbic acid as a starting material are of considerable interest industrially.

After removal of still adhering remainders of an organic solvent, if any, crude sorbic acid produced from ketene and crotonic aldehyde generally contains up to 20 percent of impurities. An about 50 percent aqueous potassium sorbate solution prepared therefrom has a brown color and shows a light absorption measured in the blue filter range (415 nm) of about 10 to 50 percent.

Potassium sorbate produced from such a solution has likewise a brown color and a degree of purity of approximately 96 percent. Neither the solution nor the salt obtained therefrom have therefore the purity which is sufficient for its use as preservative. The same applies to the other alkali metal sorbates.

It is also known that aqueous solutions prepared from alkali metal salts of sorbic acid of commercial grade are not stable and may alter during storage with brown coloration. The same may happen with crystallized alkali metal sorbates containing more than 0.2 percent of water. Hence, the experiences gained hitherto indicate that generally water has a detrimental effect on the stability of alkali metal salts of sorbic acid. Therefore, a plurality of processes to stabilize aqueous alkali metal sorbate solutions have been described, which are all characterized in that a stabilizer is added to the aqueous alkali metal sorbate solution. Proposed stabilizers are, for example, alkali metal salts of phosphoric acid, polyphosphoric acid, sulfuric acid, pyrosulfuric acid, succinic acid, tartaric acid, citric acid, 3,4-dihydroxybenzoic acid, phytic acid, ethylene diamine tetracetic acid; trimethylolaminomethane, N,N-dialkyldithiocarbamate, alkyl hydrazines or carboxylic acid hydrazides and semicarbazides.

Apart from the fact that many of the named stabilizers are pratically insufficient in their action, the known processes have the disadvantage that a foreign matter is added to the aqueous alkali metal sorbate solution in the form of a stabilizer. As aqueous sodium and potassium sorbate solutions are used practically exclusively for the preservation of foodstuffs, additional foreign substances which come into the foodstuff in this manner are not desired.

The present invention provides a process for purifying and stabilizing aqueous alkali metal salt solutions of sorbic acid which comprises treating the aqueous alkali metal sorbate solution with surface active carbon derived from coal.

Commercial active carbon made from coal generally contains more than 0.3 percent by weight of iron. It has been found that an active carbon especially suitable for use in the process of the present invention is obtained by reducing the iron content to less than 0.3 percent. To reduce the iron content, the coal can be boiled with aqueous mineral acid, preferably dilute hydrochloric acid.

For the preservation of foodstuffs aqueous solutions of sodium and potassium sorbate are used in the first place. The upper limit of the concentration of the solutions is defined by the solubility in water of the respective salt. It is about 50 percent by weight for potassium sorbate and about 30 percent by weight for sodium sorbate. The application of concentrated solutions is advantageous in practice, and therefore solutions containing more than 10 percent by weight of alkali metal sorbate are preferably stabilized.

Alkali metal sorbate solutions obtained by dissolving commercial grade sodium or potassium sorbate in water, or by reacting commercially pure sorbic acid with alkali metal hydroxide or another alkali metal salt having an alkaline reaction, for example carbonate or hydrogen carbonate, are generally stabilized using 0.005 to 0.1 g of active carbon for 100 grams of alkali metal sorbate.

Crude alkali metal sorbate solutions, obtained for example by oxidation of sorbic aldehyde in alkaline solution, or from the ketene-crotonic aldehyde polyester, or by reacting crude or insufficiently purified sorbic acid with alkali metal hydroxide, can be purified and stabilized simultaneously. For solutions of this type, having a light absorption of about 10 to 50 percent in the blue filter range (415 nm), 0.1 to 2.5 g of active carbon and generally required to purify and stabilize 100 g of alkali metal sorbate.

It is quite obvious that the amount of active carbon to be used depends on the type of active carbon and the degree of purity and the mode of preparation of the alkali metal sorbate solution or sorbic acid used. Hence, amounts below or above the indicated limits may also be used.

Owing to the fact that solutions containing alkali metal sorbate are surface active they cannot or can only insufficiently be purified with absorption agents, such as exchange resins or active carbons made from wood or cellulose. It is, therefore, surprising that the absorption agent used according to the present invention, that is active carbon made from coal, is suitable for purifying, decolorizing and stabilizing crude, or stabilizing pure, aqueous alkali metal sorbate solutions.

The process of the present invention can be carried out discontinuously or continuously. In the former case the active carbon is advantageously suspended in finely divided form in the aqueous alkali metal sorbate solution with is kept in motion by stirring or shaking. For continuous operation, the use of granular active carbon is of advantage. In this case, the carbon can be contained in a column or a system of series connected columns or towers of suitable design, either in the stationary or a mobile state, for example as sliding bed, through which the alkali metal sorbate solution to be purified and/or stabilized is passed either in a downward, or an upward direction or in parallel flow. To carry out the process of the invention on an industrial scale, continuous operation is preferred, especially for the treatment of a crude alkali metal sorbate solution.

The process of the present invention can be carried out at room temperature or at elevated temperature, higher temperatures having the advantage of shorter residence times. The upper limit of the temperature range is, of course, defined by the boiling point of water.

The process of the present invention offers a series of advantages. Because of their being stable practically without any limit of time, the alkali metal sorbate solutions treated according to the invention can be used as stock solutions or sold on the market in the form of highly concentrated solutions which was impossible so far owing to the instability of the solutions.

By evaporation of the water a very pure colorless and crystalline alkali metal sorbate can be obtained and by acidifying sorbic acid of excellent quality is produced. The products obtained in this manner are characterized by an especially good stability.

The following Examples illustrate the invention. Four different types of active carbon were compared, namely 1. Type A: on the basis of mineral coal, having a BET surface of 930 m$^2$/g
0.03 ml/g of pore volume attributable to pores having a radius of from 1 to 10 $\mu$m
0.12 ml/g of pore volume attributable to pores having a radius of from 0.1 to 1 $\mu$m
0.2 ml/g of pore volume attributable to pores having a radius of lesthan 0.1 $\mu$m 2. Type B: on the basis of mineral coal, having a BET surface of 1220 m$^2$/g
0.03 ml/g of pore volume attributable to pores having a radius of from 1 to 10 $\mu$m
0.19 ml/g of pore volume attributable to pores having a radius of from 0.1 to 1 $\mu$m
0.12 ml/g of pore volume attributable to pores having a radius of less than 0.1 $\mu$m 3. Type C: on the basis of charcoal, having a BET surface of 1370 m$^2$/g
0.5 ml/g of pore volume attributable to pores having a radius of from 1 to 10 $\mu$m
0.19 ml/g of pore volume attributable to pores having a radius of from 0.1 to 1 $\mu$m
0.09 ml/g of pore volume attributable to pores having a radius of less than 0.1 $\mu$m 4. Type D: on the basis of charcoal, having a BET surface of 1370 m$^2$/g
0.10 ml/g of pore volume attributable to pores having a radius of from 0.01 to 0.001 $\mu$m
0.59 ml/g of pore volume atrributable to pores having a radius of less than 0.001 $\mu$m.

The Examples illustrate the clear superiority of active carbons obtained from coal (types A and B) over active carbons obtained from wood (types C and D). The absorption values were determined by photometric measurement.

EXAMPLE 1:

For each test, 2,4,6,8 and 10 grams, respectively, of active carbon of types A to D were finely pulverized, the pulverulent carbon was added to 100 ml of 50 percent aqueous potassium sorbate solution and the whole was stirred for 4 hours. After having filtered off the active carbon, the light absorption of the solutions was measured and compared to that of the starting solution without carbon. The following values were obtained:

| Type | 0 | 2 | 4 | 6 | 8 | 10 g active carbon |
|------|----|----|----|----|----|----|
| A | 54 | 12 | 8 | 5 | 5 | 5 % light absorption |
| B | 54 | 26 | 22 | 17 | 10 | 8 % light absorption |
| C | 54 | 40 | 34 | 28 | 20 | 17 % light absorption |
| D | 54 | 42 | 35 | 28 | 20 | 18 % light absorption |

EXAMPLE 2:

A tube having a length of 10 meters and a diameter of 4 cm was filled with wet active carbon of types A to D, respectively (size of granules 2 to 4 mm), so as to be free from gas bubbles. A crude 50 percent aqueous potassium sorbate solution (pH of 20 percent solution 9.4) was pumped upwardly through the tube at a rate of 0.5 and 1.0 litre per hour, respectively, corresponding to a residence time of 20 and 10 hours, respectively. The light absorption of the purified solution was measured at 415 nm and compared to that of the starting solution.

| Type | starting solution | residence time 20 hours | 10 hours |
|------|------|------|------|
| A | 40 | 9 | 11 % light absorption |
| B | 40 | 11 | 14 % light absorption |
| C | 40 | 38 | 40 % light absorption |
| D | 40 | 39 | 40 % light absorption |

At a temperature of 60°C and a residence time of 3 hours the following light absorption values were measured: Type A: 10 %; Type B: 14 %; Type C: 40 % and Type D: 40 %.

EXAMPLE 3:

Active carbon of type A (size of granules 2 to 4 mm) was boiled for 1 hour with 3 percent hydrochloric acid, washed with water and neutralized with 1 percent potassium hydroxide solution. After this treatment the iron content of the carbon was 0.18 percent, prior to the treatment it had been 0.32 percent. The absorption column described in Example 2 was filled with the treated carbon and potassium sorbate solution as specified in the preceding example was pumped through the column. The following light absorption values were obtained:

| residence time | 20 hours at 25°C: | 4 % absorption |
| residence time | 10 hours at 25°C: | 5 % absorption |
| residence time | 3 hours at 60°C: | 5 % absorption |

A 50 percent aqueous solution of commercial potassium sorbate was found to have a light absorption of 13.1 percent (at 415 nm).

EXAMPLE 4:

A tube having a length of 10 meters and a diameter of 8 centimeters was continuously filled from above with carbon of type A, which had been pre-treated as described in Example 3, while the corresponding amount of exhausted carbon was continuously withdrawn at the lower end of the tube. The potassium sorbate solution was pumped in counter-current through the sliding carbon bed at a rate to obtain a residence time of 10 hours. When equilibrium had been reached, 0.9 kg of active carbon were consumed for 150 kg of crude potassium sorbate, corresponding to 0.6 percent of potassium sorbate. The purified solution had a light absorption of 4.5 percent as compared to 42 percent for the starting solution.

EXAMPLE 5:

0.5 g of commercial pulverized active carbon prepared from mineral coal (BET surface 1,220 m²/g, iron content 0.35 percent) was added to 1 liter of potassium sorbate solution prepared by dissolving 500 g of commercial pure potassium sorbate in 500 ml of water and the whole was stirred for 8 hours at room temperature, whereupon the carbon was filtered off.

Whereas an untreated control solution acquired a brownish color after 2 weeks and had turned dark brown after 6 months (light absorption at 415 nm of the fresh solution 5 percent; after 2 weeks 14 percent; after 6 months 52 percent), the solution treated with active carbon remained unchanged after standing for 6 months in a glass bottle. When the iron content of the active carbon was reduced to 0.16 percent by boiling with dilute hydrochloric acid, the same stabilizing effect could be obtained under identical conditions with 0.08 g of pulverized active carbon.

EXAMPLE 6 (Comparison)

1 l of potassium sorbate solution as used in Example 5 was stirred for 8 hours at room temperature with the addition of 2 grams of commercial pulverized active carbon made from wood (BET surface 1370 m²/g). After separation of the carbon and on standing in a glass bottle, the solution obtained had the same properties as the untreated control solution. It became darker already after 2 weeks.

EXAMPLE 7

0.2 g of the active carbon described in Example 5, which had been boiled with dilute hydrochloric acid, was added to 1 l of sodium sorbate solution prepared from 224 g of commercial sorbic acid, 80 grams of sodium hydroxide and 750 ml of water and the whole was stirred for 15 hours at room temperature. The solution obtained after separation of the carbon was still unchanged after 5 months, whereas an untreated control solution changed its color already after 5 days.

EXAMPLE 8

8 g of active carbon as specified in Example 5 and pretreated with dilute hydrochloric acid were added to 1 l of 50 percent potassium sorbate solution prepared from unpurified sorbic acid. After separation of the carbon, the solution was allowed to stand in a glass bottle. After 6 months it was still unaltered and its light absorption at 415 nm was 5 percent.

EXAMPLE 9

11 g of active carbon as specified in Example 5 and pretreated with dilute hydrochloric acid were added to 1 l of 30 percent sodium sorbate solution prepared from unpurified sorbic acid, the mixture was stirred for 12 hours at room temperature and the active carbon was separated. After 5 months the solution was still unaltered, its light absorption was 6 percent at 415 nm.

EXAMPLE 10

Glass tubes having a length of 10 m and a diameter of 4 cm were filled so as to be free from gas bubbles with commercial active carbon made from mineral coal (particle size 2 – 4 mm, BET surface 930 m²/g, iron content 0.18 percent). Potassium sorbate solution as specified in Example 8 was pumped through one of the columns and sodium sorbate solution as specified in Example 9 was pumped through the other column in upward direction at a rate of 1.0 and 0.5 l per hour, respectively. Both solutions had not changed after over 6 months.

What is claimed is:

1. A process for purifying and stabilizing an aqueous alkali metal salt solution of sorbic acid which comprises treating the solution with surface-active carbon derived from mineral coal.

2. The process of claim 1, wherein the sorbate solution is prepared by reacting crude sorbic acid and potassium hydroxide or potassium carbonate in water and has a pH of from 8.0 to 10.4 measured at 20°C in a 20 percent aqueous solution.

3. The process of claim 1, wherein the alkali metal sorbate solution is prepared by reacting pure sorbic acid with alkali metal hydroxide or alkali metal carbonate in water or by dissolving pure alkali metal sorbate in water.

4. The process of claim 1, wherein the active carbon derived from mineral coal has an iron content of less than 0.3 percent by weight.

5. The process of claim 1, wherein the sorbate solution contains 30 to 50 percent by weight of alkali metal sorbate.

6. The process of claim 2, wherein 0.1 to 2.5 g of active carbon are used for 100 g of potassium sorbate.

7. The process of claim 3, wherein 0.005 to 0.1 g of active carbon is used for 100 g of alkali metal sorbate.

* * * * *